(12) United States Patent
Gu et al.

(10) Patent No.: US 12,455,956 B2
(45) Date of Patent: Oct. 28, 2025

(54) MODEL RUNNING METHODS AND APPARATUSES

(71) Applicant: ALIPAY (HANGZHOU) INFORMATION TECHNOLOGY CO., LTD., Zhejiang (CN)

(72) Inventors: Wanyu Gu, Hangzhou (CN); Xianyi Zheng, Hangzhou (CN); Zhi Xin, Hangzhou (CN); Li Guo, Hangzhou (CN); Xiaofei Wan, Hangzhou (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 26 days.

(21) Appl. No.: 18/400,166

(22) Filed: Dec. 29, 2023

(65) Prior Publication Data

US 2024/0134965 A1 Apr. 25, 2024
US 2024/0232331 A9 Jul. 11, 2024

Related U.S. Application Data

(63) Continuation of application No. PCT/CN2022/128036, filed on Oct. 27, 2022.

(30) Foreign Application Priority Data

Nov. 6, 2021 (CN) .......................... 202111309418.7

(51) Int. Cl.
*G06F 21/53* (2013.01)

(52) U.S. Cl.
CPC .................................... *G06F 21/53* (2013.01)

(58) Field of Classification Search
CPC ........ G06F 21/53; G06F 21/57; G06F 21/602; G06N 3/08; G06N 3/045
See application file for complete search history.

(56) References Cited

U.S. PATENT DOCUMENTS

| | | | |
|---|---|---|---|
| 11,436,343 B2 * | 9/2022 | Maor | G06F 16/71 |
| 2020/0082279 A1 * | 3/2020 | Arora | G06N 3/045 |
| 2021/0165883 A1 | 6/2021 | Zhang | |
| 2021/0200882 A1 | 7/2021 | Maor et al. | |

(Continued)

FOREIGN PATENT DOCUMENTS

| | | |
|---|---|---|
| CN | 102624870 | 8/2012 |
| CN | 111275202 | 6/2020 |

(Continued)

OTHER PUBLICATIONS

International Preliminary Report on Patentability in International Appln. No. PCT/CN2022/128036, mailed on May 16, 2024, 14 pages (with English translation).

(Continued)

*Primary Examiner* — Beemnet W Dada
(74) *Attorney, Agent, or Firm* — Fish & Richardson P.C.

(57) ABSTRACT

This specification discloses model running methods, apparatuses, computer-readable storage media and systems. In an example method, an original model is split to obtain a basic model and a trusted execution environment (TEE) model; and data of the basic model and data of the TEE model are delivered to a terminal device, so that a rich execution environment (REE) in the terminal device runs the data of the basic model, and a TEE in the terminal device runs the data of the TEE model.

16 Claims, 3 Drawing Sheets

(56) References Cited

U.S. PATENT DOCUMENTS

2021/0232916 A1\* 7/2021 Veneroso ................. G06N 3/08
2024/0273220 A1\* 8/2024 Nakai ..................... G06F 21/62

FOREIGN PATENT DOCUMENTS

| CN | 111786955 | 10/2020 |
|---|---|---|
| CN | 112947935 | 6/2021 |
| CN | 113553204 | 10/2021 |
| CN | 113569265 | 10/2021 |
| CN | 114091653 | 2/2022 |
| WO | WO 2018/092071 | 5/2018 |
| WO | WO 2019/242423 | 12/2019 |

OTHER PUBLICATIONS

International Search Report and Written Opinion in International Appln. No. PCT/CN2022/128036, mailed on Jan. 18, 2023, 17 pages (with English translation).

Liu et al., "Research on the construction of virtualized package model and its technical methods in knowledge ecosystem of library," information science, Feb. 2015, p. 121-131 (with English Abstract).

\* cited by examiner

```
Receive data of a basic model and data of a TEE model, where the data
of the basic model and the data of the TEE model are obtained after an      /-401
                        original model is split
```

```
              Run the basic model by using an REE                           /-403
```

```
              Run the TEE model by using a TEE                              /-405
```

MODEL RUNNING METHODS AND APPARATUSES

CROSS-REFERENCE TO RELATED APPLICATIONS

This application is a continuation of PCT Application No. PCT/CN2022/128036, filed on Oct. 27, 2022, which claims priority to Chinese Patent Application No. 202111309418.7, filed on Nov. 6, 2021, all of which are hereby incorporated by reference in their entireties.

TECHNICAL FIELD

One or more embodiments of this specification relate to communication technologies, and in particular, to model running methods and apparatuses.

BACKGROUND

In technologies such as artificial intelligence (AI) and machine learning, a large quantity of models are established, and the models are utilized to complete a series of computing processing.

With requirements of privacy protection and efficiency, more and more models are no longer deployed in servers, but are delivered to terminal devices for running. However, a running environment of a terminal device is relatively open. When a model is run on the terminal device, the model faces increasing risks of being reversed and stolen. Consequently, security of the model is greatly reduced, and even the entire system is faced with security threats.

SUMMARY

One or more embodiments of this specification describe model running methods and apparatuses, which can improve security of model running.

According to a first aspect, a model running method is provided, including: an original model is split to obtain a basic model and a trusted execution environment (TEE) model; and data of the basic model and data of the TEE model are delivered to a terminal device, so that a rich execution environment (REE) in the terminal device runs the data of the basic model, and a TEE in the terminal device runs the data of the TEE model.

That an original model is split includes at least one of the following: the original model is split based on a predetermined split ratio; a neural network used by the original model is split, and the first M layers are used as the basic model and the last N layers are used as the TEE model, where a total quantity of layers of the neural network is M+N; and the original model is split based on a size of a running space of the TEE in the terminal device.

That data of the basic model and data of the TEE model are delivered to a terminal device includes the following: the data of the basic model is delivered to the REE in the terminal device; and the data of the TEE model are delivered to the TEE in the terminal device by using a TEE dedicated channel.

After the TEE model is obtained and before the data of the TEE model is delivered to the terminal device, the method further includes the following: the TEE model is encrypted based on a pre-obtained encryption key to obtain an encrypted model; and the data of the TEE model include the encrypted model.

That data of the basic model and data of the TEE model are delivered to a terminal device includes the following: the encrypted model is encapsulated into a TEE operator; a reconstructed model is generated based on the basic model and the TEE operator; and the reconstructed model is delivered to the REE in the terminal device.

According to a second aspect, a model running method is provided, including: data of a basic model and data of a TEE model are received, where the data of the basic model and the data of the TEE model are obtained after an original model is split; the basic model is run by using an REE; and the TEE model is run by using a TEE.

That data of a basic model and data of a TEE model are received includes the following: the REE receives the data of the basic model; and the TEE receives the data of the TEE model by using a TEE dedicated channel.

The data of the TEE model includes an encrypted model generated after the TEE model is encrypted.

That data of a basic model and data of a TEE model are received includes the following: the REE receives a reconstructed model, where the reconstructed model is generated based on the basic model and a TEE operator obtained by encapsulating the encrypted model; that the basic model is run by using an REE includes the following: the REE runs the basic model in the reconstructed model; and that the TEE model is run by using a TEE includes the following: when the REE runs to the TEE operator in the reconstructed model and cannot identify the TEE operator, the TEE operator is sent to the TEE; the TEE decapsulates the TEE operator to obtain the encrypted model; the TEE decrypts the encrypted model by using a pre-obtained decryption key to obtain the TEE model; and the TEE runs the TEE model.

After the TEE model is run by using the TEE, the method further includes the following: the TEE outputs, to the outside of the TEE, a feature vector obtained after running the TEE model; or the TEE obtains an identification result based on a feature vector obtained after running the TEE model, and outputs the identification result to the outside of the TEE.

According to a third aspect, a model running apparatus is provided, including: a model reconstruction module, configured to split an original model to obtain a basic model and a TEE model; and a model delivery module, configured to deliver data of the basic model and data of the TEE model to a terminal device, so that an REE in the terminal device runs the data of the basic model, and a TEE in the terminal device runs the data of the TEE model.

According to a fourth aspect, a model running apparatus is provided, including: a receiving module, configured to receive data of a basic model and data of a TEE model, where the data of the basic model and the data of the TEE model are obtained after an original model is split; an REE, configured to run the basic model; and a TEE, configured to run the TEE model.

According to a fifth aspect, a computing device is provided, including a memory and a processor, where the memory stores executable code, and when executing the executable code, the processor implements the method according to any one of the embodiments of this specification.

According to the model running methods and apparatuses provided in the embodiments of this specification, on a server side, a model is split to obtain a basic model part and a TEE model part. Correspondingly, on a terminal device side, an REE runs the basic model, and a TEE runs the TEE model. Because the TEE constructs a trusted execution environment in the terminal device, security can be ensured during running of the TEE model. In addition, because not the complete original model is put into the TEE for running, even if many original models are installed in the terminal device, running load of the TEE can be reduced.

DESCRIPTION OF THE DRAWINGS

To describe the technical solutions in some embodiments of this specification or in an existing technology more clearly, the following briefly describes the accompanying drawings needed for describing the embodiments or the existing technology. Clearly, the accompanying drawings in the following descriptions show some embodiments of this specification, and a person of ordinary skill in the art can still derive other drawings from these accompanying drawings without creative efforts.

DESCRIPTION OF EMBODIMENTS

As described above, when a model is deployed and run on a terminal device, the model faces increasing risks of being reversed and stolen, greatly reducing security of the model.

The following describes the solutions provided in this specification with reference to the accompanying drawings.

Figure 1:
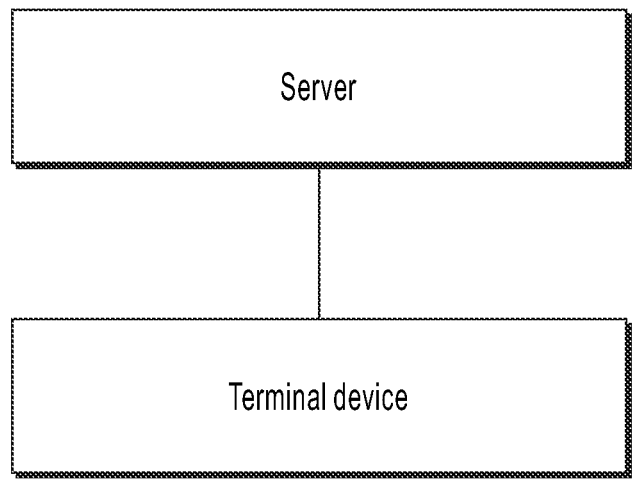
FIG. 1 is a schematic diagram illustrating a system architecture applied to some embodiments of this specification.

To facilitate understanding of this specification, a system architecture applied in this specification is first described. As shown in FIG. 1, the system architecture mainly includes a server and a terminal device. The terminal device can be any device located on a user side, such as a mobile phone, a computer, or an Internet of Things terminal device such as an Internet of Things-based outdoor advertisement projector or an Internet of Things-based automatic vending device. The server and the terminal device interact with each other by using a network. The network can include various connection types, such as a wired or wireless communication link or an optical fiber cable.

Referring to FIG. 1, a core idea of this specification is as follows: On a server side, a model is split to obtain a basic model part and a TEE model part. Correspondingly, on a terminal device side, an REE runs the basic model, and a TEE runs the TEE model. Because the TEE constructs a trusted execution environment in the terminal device, security can be ensured during running of the TEE model. In addition, because not the complete original model is put into the TEE for running, even if many original models are installed in the terminal device, running load of the TEE can be reduced.

The following separately describes processing on the server side and processing on the terminal device side by using different embodiments.

First, some embodiments are provided for the processing on the server side.

Figure 2:
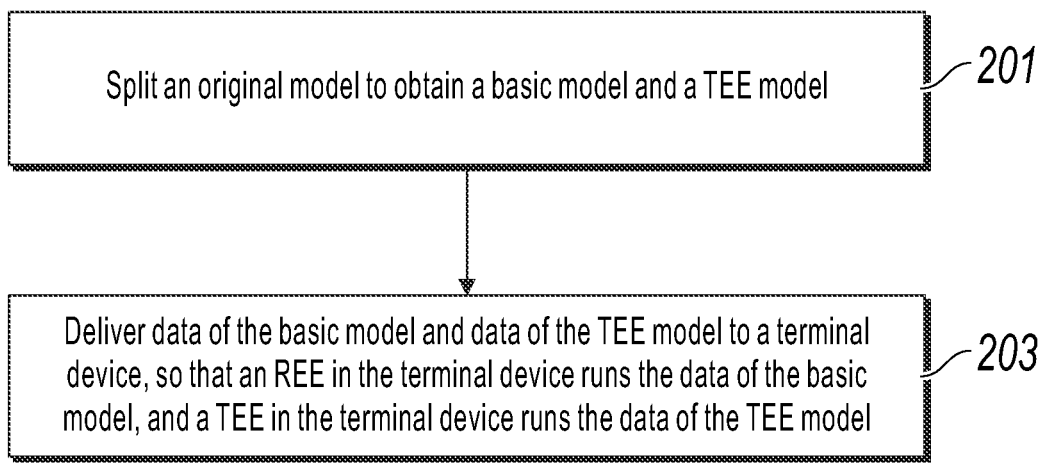
FIG. 2 is a flowchart illustrating a method for implementing model running on a server side, according to some embodiments of this specification.

FIG. 2 is a flowchart illustrating a method for implementing model running on a server side, according to some embodiments of this specification. The method is executed by a model running apparatus. The apparatus can be located in a server. It can be understood that, the method can also be performed by any apparatus, device, platform, or device cluster with computing and processing capabilities. Referring to FIG. 2, the method includes the following: Step 201: Split an original model to obtain a basic model and a TEE model.

Step 203: Deliver data of the basic model and data of the TEE model to a terminal device, so that an REE in the terminal device runs the data of the basic model, and a TEE in the terminal device runs the data of the TEE model.

The following describes processing of each step in FIG. 2 with reference to specific embodiments.

First, for step 201, the server splits the original model to obtain the basic model and the TEE model.

The TEE can provide a security zone in the terminal device to ensure that sensitive data are stored, processed, and protected in an isolated and trusted environment. Therefore, to improve security of model running in the terminal device, placing the model into the TEE in the terminal device for running can be considered. However, at present, as the terminal device has continuously increasing processing transactions, a quantity of models downloaded to the terminal device keeps growing, such as a face recognition model, a risk evaluation model, and a user shopping behavior statistics model. If the numerous models that need to be run by the terminal device are all placed into the TEE for running, running load of the TEE is excessively high, degrading processing performance of the terminal device. Therefore, splitting the original model into two parts can be considered. The basic model part is run by a universal environment (that is, the REE) in the terminal device, while the TEE model part is run by the TEE in the terminal device. As such, security of model running in the terminal device can be improved, and the running load of the TEE in the terminal device can be reduced. Therefore, in this step 201, the original model can be split in an offline way in the server.

In some embodiments of this specification, in this step 201, there are at least the following three implementations: Implementation 1: The original model is split based on a predetermined split ratio.

For example, the predetermined split ratio is that the basic model and the TEE model each occupy a half. Then, when implementation 1 is used, an original model file can be split into the former and latter parts based on a file size. The former half of the original model can be used as the basic model, and the latter half of the original model can be used as the TEE model. Certainly, there can also be another split method. For example, based on the size of the original model file, a ⅓ part in the middle of the original model can be used as the basic model, and the first ⅓ part and the last ⅓ part of the original model can be used as the TEE model.

Implementation 2: A neural network used by the original model is split, and the first M layers are used as the basic model and the last N layers are used as the TEE model, where a total quantity of layers of the neural network is M+N. Both M and N are positive integers.

An original model is usually implemented by using a neural network. The neural network includes multiple layers. For example, a convolutional neural network (CNN) includes an input layer, a convolutional layer, an activation function, a pooling layer, and a fully-connected layer. In the layers of the neural network, a layer closer to the end is more likely to involve parameter adjustment during a training process of the neural network, and makes a greater contribution to the original model, that is, has a higher requirement for security. Therefore, in some embodiments of this specification, the quantity of layers of the neural network used by the original model can be split into M+N layers in sequence by using implementation 2. The first M layers have a lower requirement for security, and therefore the first M layers can be used as the basic model. The last N layer usually involve parameter adjustment and have a higher requirement for security, and therefore the last N layers can be used as the TEE model.

Implementation 3: The original model is split based on a size of a running space of the TEE in the terminal device.

The terminal device may previously download a large quantity of models. In such a case, numerous models need to run in the TEE. Therefore, whenever the terminal device needs to download a new model, the size of the running space of the TEE in the terminal device needs to be considered to ensure running of the TEE. Therefore, in some embodiments of this specification, implementation 3 can be used to split the original model based on the size of the running space of the TEE in the terminal device, so that the TEE model obtained by splitting meets a requirement on the size of the running space of the TEE, and thereby can be run in the TEE.

In some embodiments of this specification, any two or three of the three implementations mentioned above can be combined for use. For example, implementation 2 and implementation 3 above are combined, and a size of a running space in the terminal device and a quantity of the last N layers involving parameter adjustment in the neural network of the original model are considered to split the original model.

Next, in step 203, the server delivers the data of the basic model and the data of the TEE model to the terminal device, so that the REE in the terminal device runs the data of the basic model, and the TEE in the terminal device runs the data of the TEE model.

A specific implementation process of step 203 includes at least the following implementations: Implementation A: direct respective distribution.

The server directly delivers the data of the basic model obtained by splitting to the REE in the terminal device, and directly delivers the data of the TEE model obtained by splitting to the TEE of the terminal device through a dedicated channel with the TEE.

Implementation B: centralized distribution after encryption.

The server centrally delivers the data of the basic model obtained by splitting and an encrypted model obtained by encrypting the TEE model to the REE.

In original service delivery logic, the server directly delivers the original model to the REE in the terminal device. Therefore, implementation B can be used to minimize a change to the service delivery logic.

Figures 3, 4:
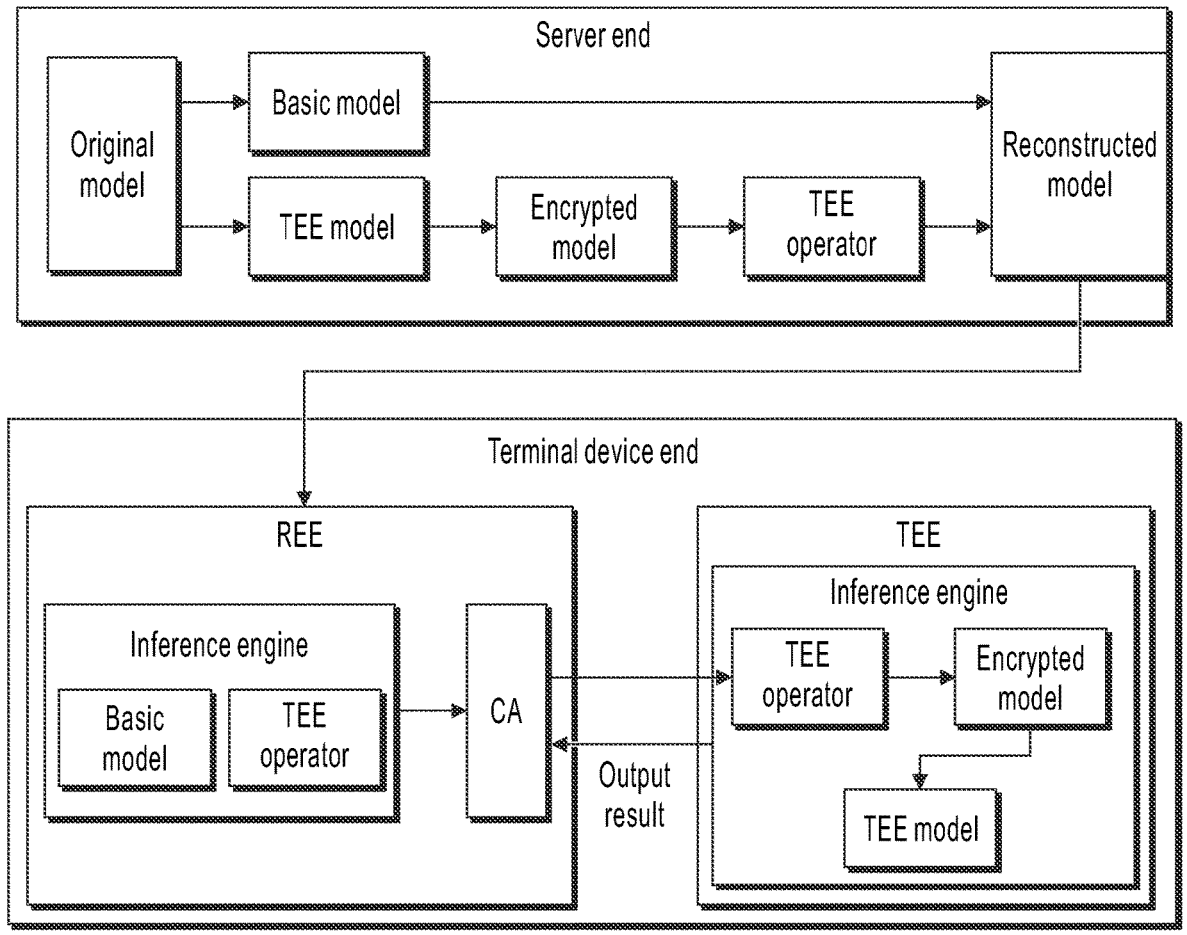
FIG. 3 is a schematic diagram illustrating a method for implementing model running, according to some embodiments of this specification.
FIG. 4 is a flowchart illustrating a method for implementing model running on a terminal device side, according to some embodiments of this specification.

Referring to FIG. 3, based on implementation B, a specific implementation process of step 203 includes step 301: The server encrypts the TEE model based on a pre-obtained encryption key to obtain an encrypted model.

In a subsequent process, data related to the TEE model is also sent to the REE in the terminal device. If the TEE model in a plaintext form is sent, leakage of the TEE model may be caused in the REE. Therefore, to improve security, the TEE model can be encrypted, and related data of the obtained encrypted model can be sent to the REE to avoid leakage of the TEE model in the REE and further improve security of model running.

In some embodiments of this specification, in this step 301, encryption can be performed by using a symmetric encryption algorithm.

The server can be enabled to obtain the encryption key in advance, and the TEE in the terminal device can be enabled to obtain a decryption key in advance. A method for acquisition can be static acquisition. For example, the server and the TEE pre-agree on a key. The method for acquisition can also be a dynamic acquisition method. For example, the server generates a key, and sends the key to the TEE by using the dedicated channel with the TEE.

Step 303: The server encapsulates the encrypted model into a TEE operator.

A purpose of step 303 is to change the encrypted model obtained after encrypting the TEE model into a form of an operator, so that the two parts of models obtained by splitting can be re-combined into one reconstructed model, and the reconstructed model can be delivered to the REE of the terminal device based on the original service logic. As such, the REE does not perceive a change to the original model. In other words, at a service link layer, specific delivery by the server and specific execution of the received model by the REE remain unchanged, thereby reducing a change to overall service implementation logic, and making the solution easier to implement.

Step 305: The server generates a reconstructed model based on the basic model and the TEE operator.

In the above-mentioned step, after the original model is split into the basic model and the TEE model, the basic model and the TEE model each include at least one operator. For example, there are three operators in the basic model and three operators in the TEE model. After the TEE model is encrypted and encapsulated into one TEE operator, the TEE model is externally embodied as one operator. In this way, after processing in step 305, the three operators included in the basic model and the one encapsulated TEE operator are used to generate one reconstructed model, and the reconstructed model is embodied as four operators to the REE.

In this step 305, the basic model and the TEE operator can be sequentially assembled based on a splitting sequence in step 201 to generate the reconstructed model. For example, in step 201, the former half and the latter half of the original model file are sequentially split into the basic model and the TEE model. Then, in this step 305, the reconstructed model is generated based on a sequence in which the basic model is before the TEE operator.

Step 307: The server delivers the reconstructed model to the REE in the terminal device.

In implementation B, an advantage of delivering the reconstructed model to the REE in the terminal device is as follows: Firstly, as described above, the reconstructed model is delivered the REE of the terminal device, so that the REE does not perceive a change to the original model. In other words, at a service link layer, specific delivery by the server and specific execution of the received model by the REE remain unchanged, thereby reducing a change to overall service implementation logic, and making the solution easier to implement. Secondly, one model includes multiple operators, and the operators follows an execution sequence. To ensure that the terminal device can still execute the execution sequence of the operators in the original model for the two parts of models obtained after splitting, that is, perform sequence control, the reconstructed model needs to be delivered to the REE, so that the REE centrally executes the reconstructed model, thereby ensuring that an execution sequence of operators in the reconstructed model is the same as the execution sequence of the operators in the original model.

The following provides some embodiments for the processing on the terminal device side.

FIG. 4 is a flowchart illustrating a method for implementing model running on a terminal device side, according to some embodiments of this specification. The method is executed by a model running apparatus. The apparatus can be located in a terminal device. It can be understood that, the method can also be performed by any apparatus, device, platform, or device cluster with computing and processing capabilities. Referring to FIG. 4, the method includes the following: Step 401: Receive data of a basic model and data of a TEE model, where the data of the basic model and the data of the TEE model are obtained after an original model is split. Step 403: Run the basic model by using an REE. Step 405: Run the TEE model by using a TEE.

Each step in FIG. 4 is separately described below.

First, in step 401, the data of the basic model and the data of the TEE model are received.

With reference to the above-mentioned embodiments processed on the server side, if the server uses implementation A in step 203, in this step 401, the REE in the terminal device receives the data of the basic model, and the TEE in the terminal device receives the data of the TEE model by using a TEE dedicated channel.

With reference to the above-mentioned embodiments processed on the server side, if the server uses implementation B in step 203, in this step 401, the REE in the terminal device receives the reconstructed model, and the reconstructed model includes the basic model and a TEE operator obtained by encapsulation based on an encrypted model of the TEE model.

Next, in step 403, the basic model is run by using the REE.

Corresponding to the above-mentioned implementation B, after receiving the reconstructed model, the REE considers the reconstructed model as an "original model", and sequentially executes operators in the reconstructed model, so that the basic model can be successfully run.

Next, in step 405, the TEE model is run by using the TEE.

Corresponding to the above-mentioned implementation B, referring to FIG. 3, a specific implementation process of this step 405 can include the following: Step 4051: In a process of executing the reconstructed model, when the REE runs to the TEE operator included in the reconstructed model, the REE cannot identify the TEE operator.

In the reconstructed model, a process of obtaining the TEE operator includes the following: encrypting the TEE model, and encapsulating the encrypted model. Although the TEE operator is embodied as a form of operator, the TEE operator is not a normal operator, and is internally encrypted. Therefore, the REE cannot identify the TEE operator.

It can be seen that, the REE can run based on an execution sequence of the operators in the reconstructed model, and further cannot identify the TEE model, meeting a service requirement.

Step 4053: The REE sends the TEE operator to the TEE.

Here, the REE invokes an external agent Certificate Authority (CA), and the CA sends the TEE operator to the inside of the TEE.

Here, the REE can use a running result of the basic model as an input of the TEE operator, and send the running result of the basic model to the TEE together with the TEE operator.

Step 4055: The TEE decapsulates the TEE operator to obtain the encrypted model.

Step 4057: The TEE decrypts the encrypted model by using a pre-obtained decryption key to obtain the TEE model.

For a method for obtaining the decryption key by the TEE in step 4057, reference can be made to the related description of step 301 in the above-mentioned embodiment.

Step 4059: The TEE runs the TEE model.

So far, the server implements delivery of the reconstructed model that is reconstructed based on the original model (the operators included in the reconstructed model follow the same execution sequence). In the terminal device, the REE runs a part (that is, the basic model) of the original model, and the TEE runs the other part (that is, the TEE model) of the original model. As such, security of the TEE model running in the TEE can be ensured, and there is no need to place the complete original model into the TEE, thereby reducing running load of the TEE.

In some embodiments of this specification, after the TEE runs the TEE model, an output result is obtained, and the output result is an output result of the original model. The TEE needs to provide the output result to the outside, for example, return the output result to the server by using the REE, so that the server can make a judgment and a decision on a related service based on the output result.

In some embodiments of this specification, the output result provided by the TEE externally includes at least the following two forms.

Form 1: direct result of the original model.

For a neural network used by the model, an obtained direct result is usually a feature vector. The TEE can output, to the outside of the TEE, the feature vector obtained after running the TEE model.

Form 2: indirect result obtained based on a direct result of the original model.

For a neural network used by the model, an obtained direct result is a feature vector. If the feature vector is provided directly to the outside, in certain scenarios, some advanced attackers may use the feature vector to reversely derive structures and parameters of the neural network used by the model, causing model leakage. Therefore, to further improve security of model running, instead of outputting the feature vector, the TEE can obtain an identification result, such as a probability value, a score value, etc. of a class based on the feature vector, and then the TEE outputs the identification result to the outside of the TEE. As the identification result output by the TEE to the outside is an identification result identifiable by users from lower dimensions, model leakage can be further avoided, and security can be further improved.

Figure 5:
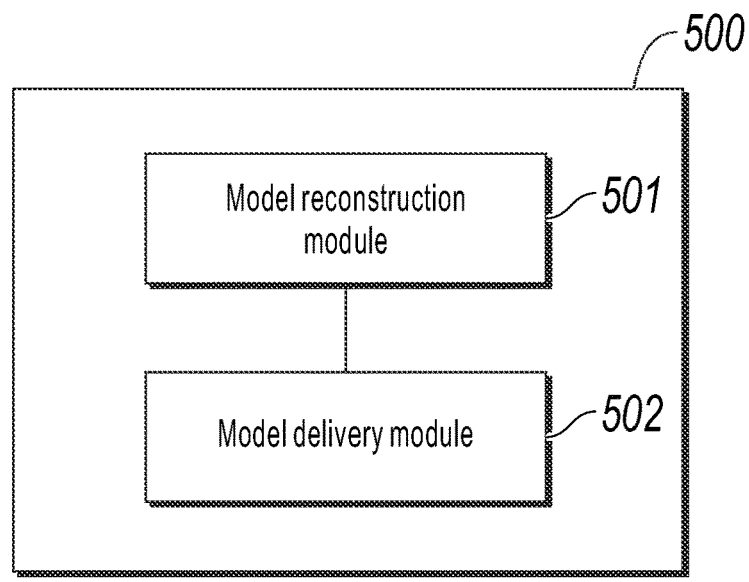
FIG. 5 is a schematic structural diagram illustrating a model running apparatus, according to some embodiments of this specification.

In some embodiments of this specification, a model running apparatus is provided. Referring to FIG. 5, the apparatus 500 can be disposed in a server, including: a model reconstruction module 501, configured to split an original model to obtain a basic model and a TEE model; and a model delivery module 502, configured to deliver data of the basic model and data of the TEE model to a terminal device, so that an REE in the terminal device runs the data of the basic model, and a TEE in the terminal device runs the data of the TEE model.

In some embodiments of the apparatus in this specification, the model reconstruction module 501 is configured to perform at least one of the following: splitting the original model based on a predetermined split ratio; splitting a neural network used by the original model, and using the first M layers as the basic model and the last N layers as the TEE model, where the last N layers involve parameter adjustment, and a total quantity of layers of the neural network is M+N; and splitting the original model based on a size of a running space of the TEE in the terminal device.

In some embodiments of the apparatus in this specification, the model delivery module 502 is configured to deliver the data of the basic model to the REE in the terminal device; and deliver the data of the encrypted model to the TEE in the terminal device by using a dedicated channel with the TEE.

In some embodiments of the apparatus in this specification, the model reconstruction module 501 can be further configured to encrypt the TEE model based on a pre-obtained encryption key to obtain an encrypted model; and correspondingly, the data of the TEE model includes the encrypted model.

In some embodiments of the apparatus in this specification, the model reconstruction module 501 is configured to encapsulate the encrypted model into a TEE operator; and generate a reconstructed model based on the basic model and the TEE operator. Correspondingly, the model delivery module 502 is configured to deliver the reconstructed model to the REE in the terminal device.

Figure 6:
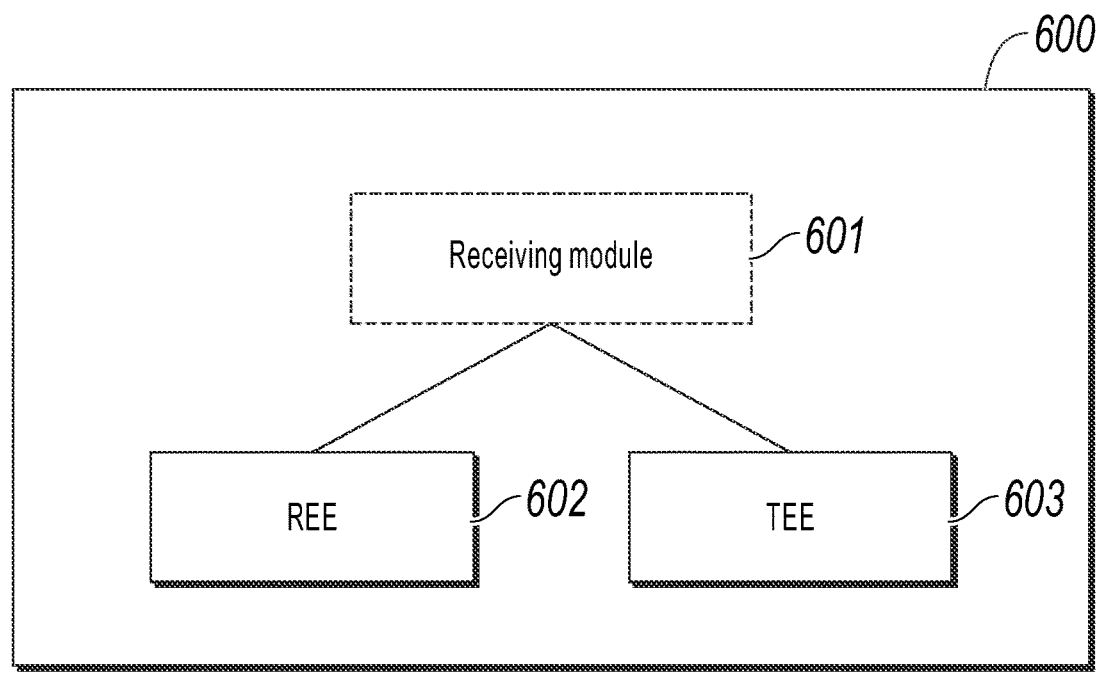
FIG. 6 is a schematic structural diagram illustrating a model running apparatus, according to some other embodiments of this specification.

In some embodiments of this specification, a model running apparatus is proposed. Referring to FIG. 6, the apparatus 600 can be disposed in a terminal device, including: a receiving module 601, configured to receive data of a basic model and data of a TEE model, where the data of the basic model and the data of the TEE model are obtained after an original model is split; an REE 602, configured to run the basic model; and a TEE 603, configured to run the TEE model.

In some embodiments of the apparatus in this specification, the receiving module 601 includes a first receiving submodule, disposed in the REE 602 and configured to receive data of a basic model that is sent by a server; and a second receiving submodule, disposed in the TEE 603 and configured to receive, by using a TEE dedicated channel, data of an encrypted model that is sent by the server.

In some embodiments of the apparatus in this specification, the data of the TEE model includes data of an encrypted model generated after the TEE model is encrypted. In some embodiments of the apparatus in this specification, the receiving module 601 is disposed in the REE and configured to receive a reconstructed model, where the reconstructed model is generated based on the basic model and a TEE operator obtained by encapsulating the encrypted model. Correspondingly, the REE 602 is configured to run the basic model in the reconstructed model; and when the REE runs to the TEE operator in the reconstructed model and cannot identify the TEE operator, send the TEE operator to the TEE. Correspondingly, the TEE 603 is configured to decapsulate, by the TEE, the TEE operator to obtain the encrypted model; decrypt, by the TEE, the encrypted model by using a pre-obtained decryption key to obtain the TEE model; and run, by the TEE, the TEE model.

In some embodiments of the apparatus in this specification, the TEE 603 is further configured to output, to the outside of the TEE, a feature vector obtained after running the TEE model; or obtain an identification result based on a feature vector obtained after running the TEE model, and output the identification result to the outside of the TEE.

Some embodiments of this specification provide a computer-readable storage medium. The computer-readable storage medium stores a computer program. When the computer program is executed in a computer, the computer is enabled to perform the method according to any embodiment of this specification.

Some embodiments of this specification provide a computing device, including a memory and a processor, where the memory stores executable code, and when executing the executable code, the processor implements the method according to any embodiment of this specification.

It can be understood that, structures illustrated in the embodiments of this specification do not constitute specific limitations on the apparatuses in the embodiments of this specification. In some other embodiments of this specification, the above-mentioned apparatuses can include more or fewer components than those shown in the figure, or combine some components, or split some components, or have different component arrangements. The illustrated components can be implemented by hardware, software, or a combination of software and hardware.

Because content such as information exchanges and execution processes between the modules of the above-mentioned apparatuses and systems are based on a same concept as the method embodiments of this specification, for specific content, reference can be made to the description in the method embodiments of this specification. Details are omitted here for simplicity.

The embodiments in this specification are described in a progressive way. For same or similar parts of the embodiments, reference can be made to the embodiments mutually. Each embodiment focuses on a difference from other embodiments. Particularly, an apparatus embodiment is substantially similar to a method embodiment, and therefore is described briefly. For related parts, reference can be made to partial descriptions in the method embodiment.

A person skilled in the art should be aware that in the above-mentioned one or more examples, functions described in this specification can be implemented by hardware, software, widget, or any combination thereof. When implemented by using software, these functions can be stored in a computer-readable medium or transmitted as one or more instructions or one or more pieces of code on a computer-readable medium.

The above-mentioned specific implementations further describe in detail the objectives, technical solutions, and beneficial effects of this specification. It should be understood that the descriptions above are merely specific implementations of this specification and are not intended to limit the protection scope of this specification. Any modifications, equivalent replacements, or improvements made on the basis of the technical solutions of this specification shall fall within the protection scope of this specification.

What is claimed is:

1. A computer-implemented method, comprising:
splitting an original model to obtain a basic model and a trusted execution environment (TEE) model; and
delivering data of the basic model and data of the TEE model to a terminal device to enable a rich execution environment (REE) in the terminal device runs the data of the basic model, and a TEE in the terminal device runs the data of the TEE model;
wherein:
after obtaining the TEE model and before delivering the data of the TEE model to the terminal device, the computer-implemented method further comprises:
encrypting the TEE model based on a pre-obtained encryption key to obtain an encrypted model; and the data of the TEE model comprises the encrypted model;
wherein the delivering data of the basic model and data of the TEE model to a terminal device comprises:
encapsulating the encrypted model into a TEE operator;
generating a reconstructed model based on the basic model and the TEE operator; and
delivering the reconstructed model to the REE in the terminal device.

2. The computer-implemented method according to claim 1, wherein the splitting an original model comprises at least one of:
splitting the original model based on a predetermined split ratio;
splitting a neural network used by the original model, and using the first M layers as the basic model and the last N layers as the TEE model, wherein a total quantity of layers of the neural network is M+N; or
splitting the original model based on a size of a running space of the TEE in the terminal device.

3. The computer-implemented method according to claim 1, wherein the delivering data of the basic model and data of the TEE model to a terminal device comprises:
delivering the data of the basic model to the REE in the terminal device; and
delivering the data of the TEE model to the TEE in the terminal device by using a TEE dedicated channel.

4. A computer-implemented method, comprising:
receiving data of a basic model and data of a trusted execution environment (TEE) model, wherein the data of the basic model and the data of the TEE model are obtained after an original model is split into the basic model and the TEE model;
running the basic model by using a rich execution environment (REE); and
running the TEE model by using a TEE;
wherein:
the receiving data of a basic model and data of a TEE model comprises: receiving, by the REE, a reconstructed model, wherein the reconstructed model is generated based on the basic model and a TEE operator obtained by encapsulating an encrypted model;
the running the basic model by using an REE comprises: running, by the REE, the basic model in the reconstructed model; and
the running the TEE model by using a TEE comprises:
receiving, by the TEE, the TEE operator to from the REE;
decapsulating, by the TEE, the TEE operator to obtain the encrypted model;
decrypting, by the TEE, the encrypted model by using a pre-obtained decryption key to obtain the TEE model; and
running, by the TEE, the TEE model.

5. The computer-implemented method according to claim 4, wherein the receiving data of a basic model and data of a TEE model comprises:
receiving, by the REE, the data of the basic model; and
receiving, by the TEE, the data of the TEE model by using a TEE dedicated channel.

6. The computer-implemented method according to claim 4, wherein the data of the TEE model comprises the encrypted model generated after the TEE model is encrypted.

7. The computer-implemented method according to claim 4, wherein the TEE operator is received from the REE in response to that the REE is not able to recognize the TEE operator when the REE runs to the TEE operator in the reconstructed model.

8. The computer-implemented method according to claim 4, wherein after the running the TEE model by using a TEE, the computer-implemented method further comprises:
outputting, by the TEE to the outside of the TEE, a feature vector obtained after running the TEE model.

9. The computer-implemented method according to claim 4, wherein after the running the TEE model by using a TEE, the computer-implemented method further comprises: obtaining, by the TEE, an identification result based on a feature vector obtained after running the TEE model, and outputting the identification result to the outside of the TEE.

10. A computer-implemented system comprising a terminal device that comprises:
one or more processors; and
one or more memory devices interoperably coupled with the one or more processors and having tangible, non-transitory, computer-readable storage media storing one or more instructions that, when executed by the one or more processors, perform operations comprising:
receiving data of a basic model and data of a trusted execution environment (TEE) model, wherein the data of the basic model and the data of the TEE model are obtained after an original model is split into the basic model and the TEE model;
running the basic model by using a rich execution environment (REE); and
running the TEE model by using a TEE;
wherein:
the receiving data of a basic model and data of a TEE model comprises: receiving, by the REE, a reconstructed model, wherein the reconstructed model is generated based on the basic model and a TEE operator obtained by encapsulating an encrypted model;
the running the basic model by using an REE comprises: running, by the REE, the basic model in the reconstructed model; and
the running the TEE model by using a TEE comprises:
receiving, by the TEE, the TEE operator to from the REE;
decapsulating, by the TEE, the TEE operator to obtain the encrypted model;
decrypting, by the TEE, the encrypted model by using a pre-obtained decryption key to obtain the TEE model; and
running, by the TEE, the TEE model.

11. The computer-implemented system according to claim 10, wherein the receiving data of a basic model and data of a TEE model comprises:
receiving, by the REE, the data of the basic model; and
receiving, by the TEE, the data of the TEE model by using a TEE dedicated channel.

12. The computer-implemented system according to claim 10, wherein the data of the TEE model comprises the encrypted model generated after the TEE model is encrypted.

13. The computer-implemented system according to claim 10, further comprising a server that comprises:
one or more second processors; and
one or more second memory devices interoperably coupled with the one or more second processors and having second tangible, non-transitory, computer-readable storage media storing one or more second instructions that, when executed by the one or more second processors, perform second operations comprising:

splitting the original model to obtain the basic model and the TEE model; and delivering data of the basic model and data of the TEE model to the terminal device to enable the REE in the terminal device runs the data of the basic model, and the TEE in the terminal device runs the data of the TEE model.

14. The computer-implemented system according to claim 13, wherein the splitting an original model comprises at least one of:

splitting the original model based on a predetermined split ratio;

splitting a neural network used by the original model, and using the first M layers as the basic model and the last N layers as the TEE model, wherein a total quantity of layers of the neural network is M+N; or splitting the original model based on a size of a running space of the TEE in the terminal device.

15. The computer-implemented system according to claim 13, wherein the delivering data of the basic model and data of the TEE model to a terminal device comprises:

delivering the data of the basic model to the REE in the terminal device; and delivering the data of the TEE model to the TEE in the terminal device by using a TEE dedicated channel.

16. The computer-implemented system according to claim 13, wherein:

after obtaining the TEE model and before delivering the data of the TEE model to the terminal device, the second operations further comprise encrypting the TEE model based on a pre-obtained encryption key to obtain the encrypted model, the data of the TEE model comprises the encrypted model; and the delivering data of the basic model and data of the TEE model to a terminal device comprises:

encapsulating the encrypted model into the TEE operator;

generating the reconstructed model based on the basic model and the TEE operator; and delivering the reconstructed model to the REE in the terminal device.

\* \* \* \* \*